Figures 1, 2:
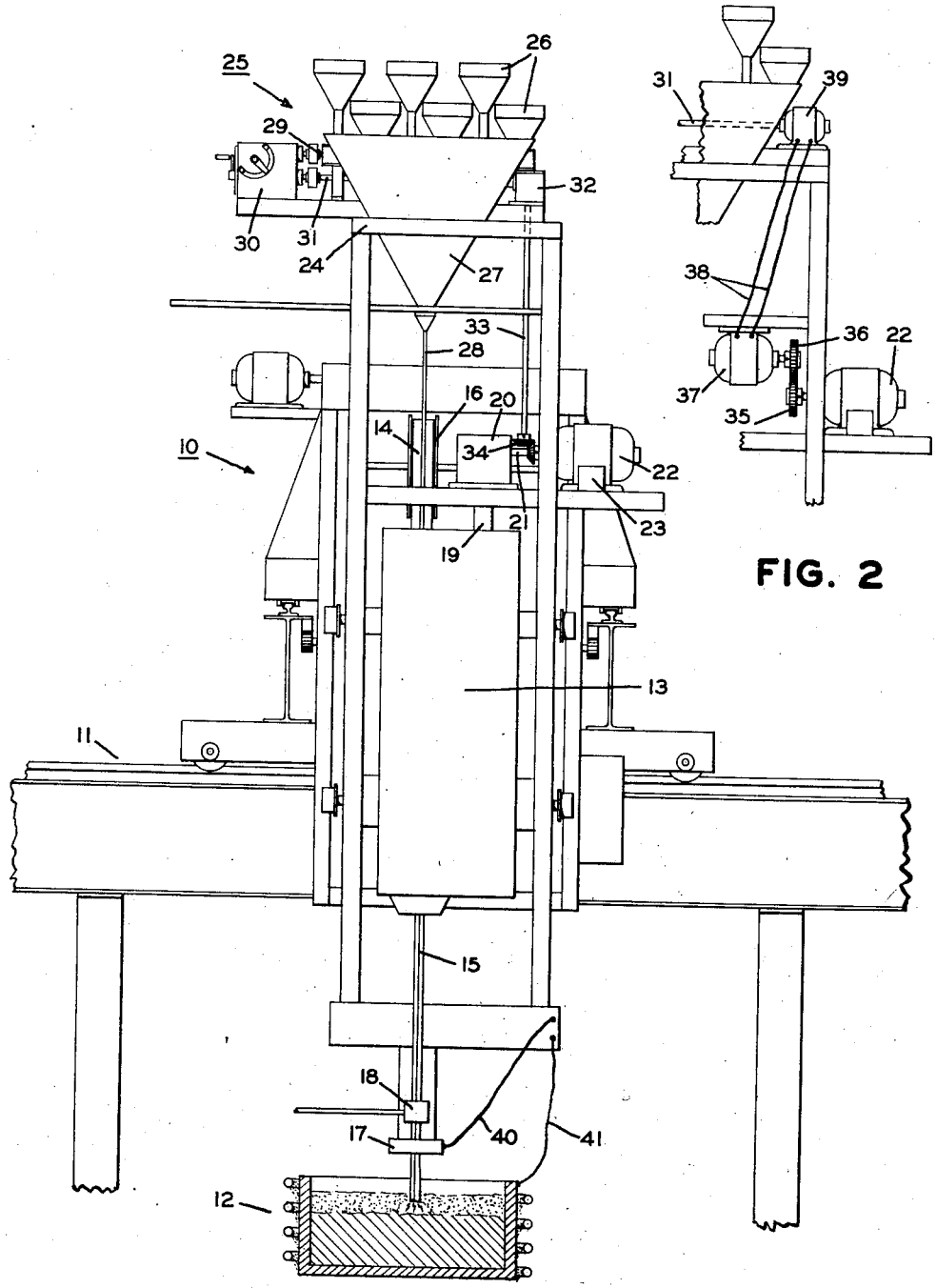

Aug. 19, 1941.  R. K. HOPKINS  2,253,207

ELECTRIC METAL FUSING APPARATUS

Filed April 10, 1940

INVENTOR
ROBERT K. HOPKINS
BY  Virgil F. Davies
ATTORNEY

Patented Aug. 19, 1941

2,253,207

UNITED STATES PATENT OFFICE 2,253,207

ELECTRIC METAL FUSING APPARATUS

Robert K. Hopkins, New York, N. Y., assignor to M. W. Kellogg Co., New York, N. Y., a corporation of Delaware Application April 10, 1940, Serial No. 328,800

6 Claims. (Cl. 219—8)

This invention relates to the electrical fusion of metals and particularly to the type of operation in which a metal of desired analysis is produced by the electrical fusion of metals made up of the constituents of the desired metal.

This type of operation is disclosed in my prior U. S. Patent No. 21,191,471. In the disclosure just mentioned, constituents of the desired metal are supplied to the gap, through which the electrical current is discharged and at which the constituents are fused, in separately controlled streams. One or more of the constituents are supplied in the form of a hollow metal electrode and other of the constituents are supplied in the form of metal powder, granules, pellets, etc., through the hollow electrode to the gap at its end. By choosing the proper constituents and by suitably controlling their rates of supply to the gap, metal of desired analysis is easily and efficiently produced.

As disclosed in my prior patent, above identified, the rate of supply of the hollow electrode to the gap is controlled by employing arc control arrangements, such as are common in the arc welding and electric arc furnace arts, to maintain an electric discharge of predetermined character, i. e., an electrical discharge that will fuse the hollow electrode at the desired rate. While this manner of control gives the desired rate over a period of time, the rate is an average of a constantly varying rate rather than a rate that is constant, or substantially so, for each increment of the operation. The supply rate, or rates, of the constituents supplied through the hollow electrode is controlled by metering arrangements that are unaffected by variations at the gap so that these constituents are supplied at a constant predetermined rate throughout the operation. If the metal produced were solidified continuously immediately after the fusion of its constituents there would be considerable variation in analyses. This result is avoided by carrying on the operation under such conditions that there is always present a sufficiently large body of molten metal to average the varying rate and thus obtain metal of uniform analysis.

This manner of avoiding non-uniform analysis does not ordinarily affect the efficiency of the process but in special cases imposes a limit on the speed at which it can be carried out; for instance, when depositing a thin coating of alloy on a base metal, the speed of traverse of the hollow electrode over the base metal and the rate of production of the alloy must be kept down to the values at which a sufficiently large body of molten metal is produced to average the varying rate.

I have found that this limitation may be removed for all practical purposes by varying the rate of feed of the constituents through the hollow electrode in accordance with the variation in rate of fusion of the hollow electrode.

It is the primary object of this invention to provide a method, and apparatus for carrying it out in practice, for producing metal of desired analysis by the fusion of its constituents at a gap through which electric energy is discharged, one or more of the constituents being supplied to the gap as a hollow metal electrode and another, or others, of the constituents being supplied in particle form to the gap through the hollow electrode, the rate of feed of the hollow electrode being controlled by arrangements which are effective to vary the feed of the hollow electrode as required to maintain the electric energy discharge through the gap at substantially a predetermined value, the rate of feed of the constituents supplied through the hollow electrode being controlled by metering arrangements that will vary the rate of feed of the granular material in accordance with the variation in the rate of feed of the hollow electrode whereby a predetermined relation between the rate of feed of the hollow electrode and the rate of feed of the granular material is maintained constant.

The further objects and advantages of the invention will be apparent from a consideration of the following description taken with the accompanying drawing, in which—

Fig. 1 is a front view of a preferred form of the apparatus of the invention, and Fig. 2 is a diagrammatic fragmentary view embodying an alternative arrangement for obtaining the novel results of the invention.

The electrical metal fusing machine 10 with the exception of certain details to be pointed out hereinafter, approximates that completely shown and described in my prior Patent No. 2,191,476, hence, a detailed description will not be repeated here.

Machine 10 is supported on a suitable structure 11 for movement in all directions over mold 12. Machine 10 is also so arranged that it may be moved vertically with respect to mold 12. Mold 12 as shown is a water cooled metal mold, preferably of copper, but any preferred type of mold may be used. When the invention is used in the coating of metal bodies, the metal body to be coated is substituted for mold 12.

Within housing 13 is the tube forming mechanism that converts the flat metal strip 14 into a hollow pipe-like electrode 15. Strip 14 which is made up of a constituent or constituents of the ultimately desired metal, is conveniently carried on a reel 16. The formed hollow electrode passes from the tube forming mechanism through a contact nozzle 17 from whence it proceeds toward mold 12. One side of the electric current supply is connected to nozzle 17 by cable 40 while the other side is connected to mold 12 by cable 41. The current may be obtained from a generator mounted on machine 10 but it is preferably obtained from a source external to machine 10 and led thereto by suitable cables, not shown. A vibrating device 18 is provided adjacent nozzle 17 to prevent the clogging of the end of hollow electrode 15.

The tube forming mechanism is driven by a shaft 19 that is connected by gears, in gear-box 20, to the shaft 21 of motor 22. Motor 22, the feed motor for hollow electrode 15, includes in its circuit arc control arrangements which are indicated as within housing 23. The arc control arrangements are electrically connected to the electrical energy circuit of hollow electrode 15 and operate to control the rotation of motor 22 as required to maintain an electrical discharge through the gap at the end of hollow electrode 15 of substantially constant predetermined characteristics. The arc control arrangements are preferably suitable for any one of a range of values so as to give the apparatus a desired flexibility. The arc control arrangements as well as their connections have not been specifically shown and described as these arrangements are well known in the electric arc furnace and the electric arc welding arts.

This mode of control of the feed of hollow electrode 15 does not result in a constant feed of the hollow electrode but rather in a feed that constantly varies and hunts about rather than stays at a predetermined value. The variations are such, however, that they average so that it can be justly said that the hollow electrode is fed, or consumed, over any practical operation period at substantially a predetermined rate.

On a platform 24 above housing 13 are mounted metering devices 25. These devices are preferably of the type shown and described in my prior Patent No. 2,174,175, although metering devices of any comparable type may be employed. While six metering devices 25 are included in the apparatus shown a smaller or greater number may be used. Each of the devices is provided with a hopper 26 in which is placed the particular granular material to be metered by the particular device. The metered materials pass into a common hopper 27 from whence they pass through tube 28 into the formed hollow electrode 15. The granular materials are alloys or metals made up of constituents of the final desired metal.

Metering devices 25 are arranged to be driven by shaft 29 that is connected to the output of the combined clutch and speed changer box 30. The input of box 30 is connected to shaft 31 which in turn is connected through gears in box 32 to shaft 33. Shaft 33 is driven through bevel gears 34 by motor shaft 21. The wire electrodes together with their feeding and control arrangements shown in my prior Patent No. 2,191,476 have been omitted as they are not required for a full understanding of this invention.

As shown in Fig. 2 the connection between motor 22 and the driving means for devices 25 may be electrical instead of mechanical. In Fig. 2 motor 22 drives a gear 35 which meshes with a similar gear 36 on the shaft of generator 37. The current generated by generator 37 is led by wires 38 to motor 39 that drives shaft 31. Generator 37 and motor 39 are both of the synchronous type so that by this arrangement the rotation of shaft 21 is exactly and simultaneously reproduced by shaft 31. In place of the synchronous motor and generator arrangement shown the well known "Selsyn" arrangement may be employed.

While the invention is of general application and may be used equally well in the production of ingots, and similar bodies, of a single analysis, or in the production of coated bodies, wherein base metal is coated with a layer of metal of a different analysis either by depositing the coating metal on a horizontal surface of the base metal or against a vertical surface of the base metal, I choose to describe it in connection with the production of an ingot of a single analysis as this is the simpler operation.

In the production of an ingot of a desired analysis, knowing the preferred fusing capacity of the apparatus and the preferred fusion rate, the setting of arc control 23 of a hollow electrode of the selected material, as well as the analysis of the selected materials, it is a simple matter to determine the rate at which the selected granular material, or materials, must be supplied to produce the desired metal. With this information, and knowing the speed of motor 22 at the selected fusion rate of the hollow electrode it is again a simple matter to determine the setting of the metering device, or devices, 25 required. Obviously, once the metering device, or devices, have been properly set a change in speed of motor 22 will not alter the proportion between the rates of supply of the material of the hollow electrode and the metered granular material or materials.

In the production of ferrous alloys such as chrome-iron or chrome steels, chrome-nickel steels, etc., strip 14 will usually be a low carbon steel or iron, Armco iron for example, and the granular materials ferro-alloys such as ferrochrome, ferro-manganese etc., or pure metals such as nickel etc.

After the necessary settings and adjustments have been made mold 12 is positioned and the water circulated around it. A plug of metal, preferably of the desired analysis is placed in the bottom of the mold. To facilitate starting, the hollow electrode is fed almost to the surface of the metal plug and a wad of steel wool, or similar arc starter, interposed between the electrode end and the plug. The electrode end is then covered with a deep blanket of protective flux.

The operation is begun by closing the electrical circuit of the hollow electrode and the circuit of motor 22.

The initial surge of current destroys the arc starter and establishes a gap between the end of electrode 15 and the metal plug in the bottom of the mold. Arc control arrangements 23 control the speed of rotation of motor 22 as required to maintain an energy discharge of substantially constant characteristics through the gap. Since the characteristics of the discharge vary constantly, as is evident from an inspection of the meters, the rotation of motor 22 varies constantly, hence, the burnoff rate of hollow electrode 15 varies constantly from the predetermined value. However, since the metering devices 26 are driven by motor 22, or as in Fig. 2 are driven by a shaft that duplicates the rotation of motor 22, the amount of granular material metered also varies constantly and in such a manner that the proportion between the constituents supplied by the electrode and those supplied by the granular material is maintained invariable.

While there is a time interval between the metering and the fusing of the granular material, this interval is small and has no effect on the analysis of the deposited metal; in any practical operation there will be a sufficiently large body of molten metal present to average the variations due to this lag.

I claim:

1. In metal producing apparatus, means for feeding a hollow metal electrode toward a metal body, a metering device adapted to meter granular metallic material, means for supplying metered granular material from said device into said hollow electrode to be fused with the metal of said electrode, and means for controlling said metering device and said feeding means to maintain an electric discharge of substantially constant predetermined characteristics from the end of said hollow electrode and a fixed predetermined relation between the rate of granular material supply to the hollow electrode and the rate at which the hollow electrode is supplied.

2. In metal producing apparatus, a device for feeding a hollow metal electrode toward a metal body, a motor for driving said feeding device, a metering device adapted to meter granular metallic material, means for driving said metering device including a shaft, means for supplying the material metered by said metering device into said hollow electrode, means for rotating said shaft at the same speed as said motor whereby an established relation between the feed rate of the hollow electrode and the rate of supply of the granular material into the hollow electrode is constantly maintained, and means for controlling the operation of said motor to maintain an electric current discharge of substantially constant characteristics from the end of said hollow electrode.

3. In metal producing apparatus, a device for feeding a metal electrode toward a metal body, a motor for driving said feeding device, a metering device adapted to meter granular metallic material, means including a shaft driven by said motor for driving said metering device, means for supplying the material metered by said device to the electric current discharge maintained from the end of said electrode, and means for controlling the rotation of said motor to maintain an electric current discharge of substantially constant characteristics from the end of said electrode.

4. In metal producing apparatus, a device for feeding a metal electrode toward a metal body, a motor for driving said feeding device, a metering device adapted to meter granular metallic material, means including a shaft for driving said metering device, means for supplying the material metered by said metering device to the electric current discharge maintained from the end of said electrode, electrically operated means connected to said motor and to said shaft operatable to rotate said shaft to duplicate the rotation of said motor, and means connected to the electrical circuit of said hollow electrode for controlling the operation of said motor to maintain an electrical discharge of substantially constant characteristics from the end of said electrode.

5. In metal producing apparatus, a device for feeding a hollow metal electrode toward a metal body, a motor for driving said feeding device, a metering device adapted to meter granular metallic material, means including a shaft for driving said metering device, means for conveying the metered material from said metering device into said hollow electrode, a synchronous motor and generator set, the generator being connected to be driven by said feed motor and the motor being connected to drive said shaft, and means connected to the electrical circuit of said hollow electrode for controlling the operation of said feed motor to maintain an electrical current discharge of substantially constant characteristics from the end of said hollow electrode.

6. In metal producing apparatus, means for feeding a hollow electrode towards a conductive body, means effective to control the operation of said feeding means to maintain an electric current discharge of substantially constant predetermined characteristics from the end of said hollow electrode, a metering device adapted to supply metallic material at controlled rates into said hollow electrode to be fused by said electric current discharge, and means controlled by said electrode feeding means for operating said metering device to maintain an established relation between the rate at which said hollow electrode is fed and the rate at which said metallic material is fed through said hollow electrode.

ROBERT K. HOPKINS.